United States Patent [19]

Patton et al.

[11] 3,971,453

[45] July 27, 1976

[54] HYDROSTATIC CONTROL - PIVOT STEERING

[75] Inventors: Jon Richard Patton; Ronald Loren Sisson, both of Jackson, Mich.

[73] Assignee: Clark Equipment Company, Buchanan, Mich.

[22] Filed: Oct. 29, 1974

[21] Appl. No.: 518,405

Related U.S. Application Data

[62] Division of Ser. No. 326,440, Jan. 24, 1973, Pat. No. 3,888,323.

[52] U.S. Cl. .............................. 180/6.48; 180/66 R
[51] Int. Cl.² ............................................ B62D 9/00
[58] Field of Search .............. 180/66 R, 66 F, 82 A, 180/6.3, 6.48; 192/4 A, 4 C, 13 R

[56] References Cited
UNITED STATES PATENTS

| | | | |
|---|---|---|---|
| 2,872,000 | 2/1959 | Herndon et al. | 192/4 A |
| 3,017,941 | 1/1962 | Baker | 192/4 A |
| 3,125,201 | 3/1964 | Fisher | 192/4 A |
| 3,523,597 | 8/1970 | Lemieux | 192/4 A |
| 3,540,220 | 11/1970 | Lauck | 180/66 R |
| 3,595,343 | 7/1971 | Williamson | 180/66 |
| 3,640,360 | 2/1972 | Dollase | 192/4 A |
| 3,696,897 | 10/1972 | Momose | 192/13 R |
| 3,715,017 | 2/1973 | Jenney | 192/4 A |
| 3,757,915 | 9/1973 | Momose | 192/4 A |
| 3,774,736 | 11/1973 | Shin Ito | 192/4 A |
| 3,862,668 | 1/1975 | Ward | 180/6.48 |

Primary Examiner—M. H. Wood, Jr.
Assistant Examiner—David M. Mitchell
Attorney, Agent, or Firm—Paul H. Gallagher

[57] ABSTRACT

A pivot steering vehicle having a pair of hydrostatically operated driving wheels; and motors for driving those wheels which are driven by variable speed, reversible pumps; a control system is provided, having valve means for controlling the pressure applied to the pumps for controlling the speed and direction of the pumps; and cam means is provided which, in response to turning movements of the steering wheel, reduces the speed of the inside driving wheel, and after a predetermined point in the turning movements of the steering wheel, reverses the direction of that wheel.

10 Claims, 7 Drawing Figures

HYDROSTATIC CONTROL - PIVOT STEERING

This application is a division of our prior and copending parent application, Ser. No. 326,440, filed Jan. 24, 1973 now U.S. Pat. No. 3,888,323.

CROSS-REFERENCES

Our co-pending application Ser. No. 518,404, filed of even date herewith, entitled Hydrostatic Control - Pivot Steering, which is also a division of the above mentioned parent application.

FIELD OF THE INVENTION

The invention is particularly adaptable to pivot steering vehicles of the type disclosed and claimed in the above mentioned parent application wherein the driving wheels are hydrostatically operated. The present invention relates to control means for controlling the fluid, and the pressure thereof, for driving the driving wheels.

OBJECTS OF THE INVENTION

A broad object of the invention is to provide novel control means for controlling fluid in driving hydrostatically operated driving wheels in a vehicle.

A more specific object is to provide control means for controlling hydrostatically operated driving wheels in a vehicle wherein the control means is progressively actuatable, and in response to progressive actuation of the control means, the wheels are correspondingly and progressively controlled.

A still more specific object is to provide control means of the character referred to in the immediately preceeding paragraph, particularly adaptable to vehicles in which in the turning movements of the vehicle, and in response to such turning movements, the driving wheels follow paths of different radii, wherein the control means is operable for driving the driving wheels at different speeds according to the paths of different radii.

Another object of the invention is to provide novel control means for pivot steering of a vehicle, such as a lift truck, having hydrostatically operated driving wheels, including an arrangement for decreasing the speed of the inside driving wheel in a turn, whereby to increase the efficiency and effectiveness in the steering operation by preventing scrubbing of the driving wheels.

A still further object is to provide a novel hydrostatic control means for use in a steering arrangement for a vehicle of the character referred to above, for controlling flow of hydrostatic fluid to various control elements and to the pumps provided for the hydrostatic motors for driving the wheels.

A still further object is to provide control means for a steering arrangement for a vehicle which is extremely simple in hydrostatic and mechanical features.

Another object of the invention is to provide power control apparatus for driving and steering in which the operator can readily "feel" the reaction of the instrumentalities being controlled, similar to the situation in which the various elements are manually controlled.

DESCRIPTION OF A PREFERRED EMBODIMENT

Figure 1:
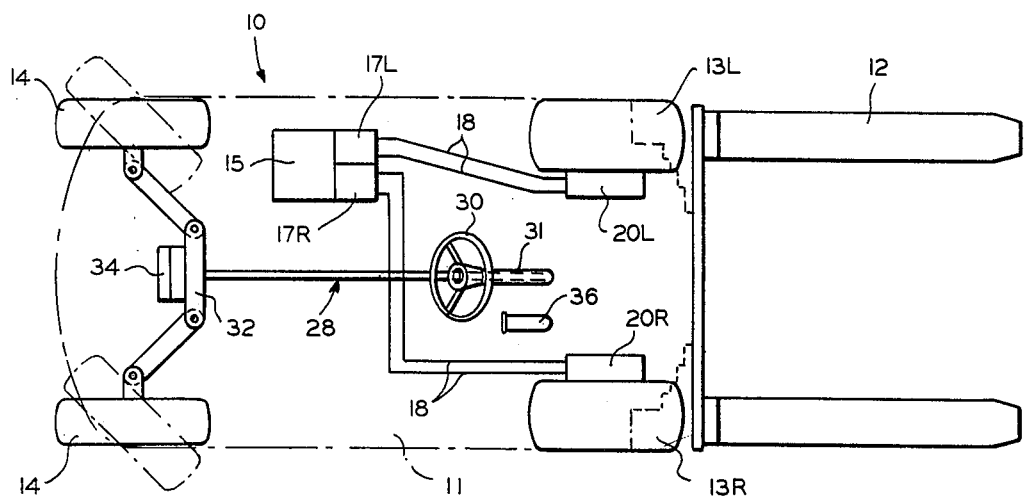
FIG. 1 is a top view, principally diagrammatic, of a vehicle to which the invention is particularly adaptable, and indicating certain components of the steering arrangement.

The drawings and descriptive specification in the present instance are substantially identical with those of the parent application identified above. Both are repeated in full herein so as to render it more convenient to understand and appreciate the control means containing the principal features of the present invention.

The control means and the steering apparatus and arrangement of the present invention are particularly adaptable to lift trucks, and hydrostatically operated lift trucks. In such trucks, the drive is accomplished through driving wheels, and the steering operation is accomplished at least partially through relatively varying the speeds of the outside and inside wheels, and even reversing the direction of the inside wheel at least in certain portions of the steering operation. While relatively varying the speed of the outside and inside wheels, and even reversing the wheels, broadly is known, the present invention includes a novel arrangement of control for accomplishing those specific steps. The steering of a vehicle about a point, or vertical axis, between the driving wheels is generally known as center point steering.

Many of the elements or components in the device are duplicated and identical in construction and for convenience are identified by the same reference numerals but with different subscripts such as R and L, for right and left, and F and B, for front and back.

Referring first to FIG. 1 this figure shows a vehicle 10 to which the invention is applied, the vehicle being a lift truck having a body 11 and a fork 12. The vehicle has a pair of driving wheels 13 and steerable wheels 14.

Figure 2:
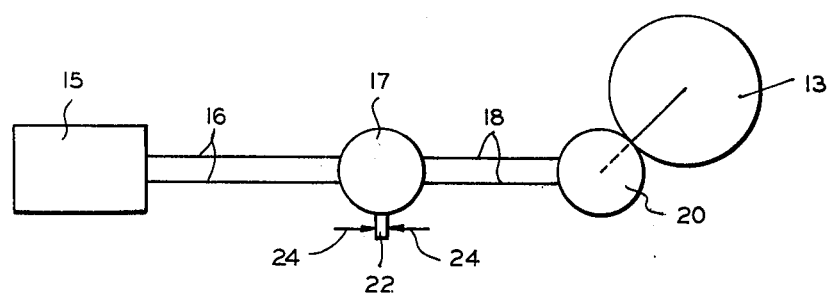
FIG. 2 is a diagrammatic view of the principal components of a hydrostatic drive of a vehicle.

FIG. 2 is a diagrammatic illustration of the power plant of the lift truck and certain elements of the chain of drive therefrom, which are also included in FIG. 1. The power plant includes an engine 15 which is utilized for driving the lift truck, and for lifting the lift fork. The engine is connected by lines 16 to a pump 17 in itself of known character (but see below), the latter being connected by lines 18 to a motor 20 directly connected with one of the driving wheels 13. The vehicle includes a single engine 15 but separate drive transmitting components to the driving wheels 13, i.e., two pumps 17 are provided, both driven by the engine. These may be separate pumps or pump units incorporated in a single structure as indicated in FIG. 1. The motors 20 are fixed and each is individually related to one of the driving wheels 13. The pump 17 has a control element 22 movable angularly for controlling the pump, and the control arrangement of the present invention is applied to the steering operation by controlling the pump 17 through this control element 22 by means of plungers 24, as explained in detail hereinbelow, these plungers being represented by arrows in FIG. 2.

The pumps 17 are of variable speed and reversible character. The speed of drive of the lift truck, and the rate of movement of the lift fork may be as desired, and at different rates, and the control of the steering operation, the power for which is derived from the same engine, is independent of the speed of the truck and movements of the lift fork, this fact being a principal object of the invention of the above mentioned parent application.

Figure 3:
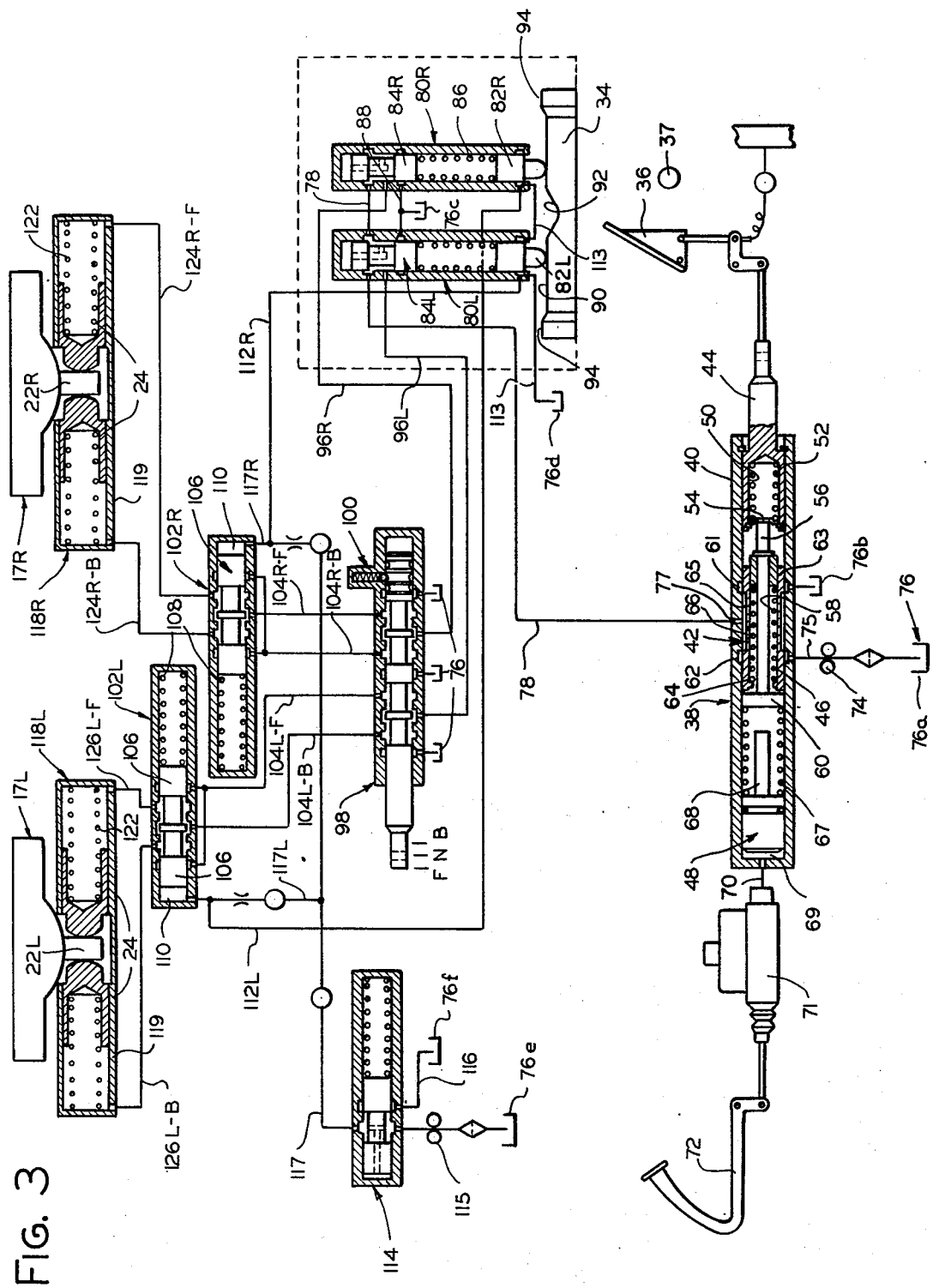
FIG. 3 shows the principal components of the hydrostatic driving and steering control, partially diagrammatic, and indicating the interior construction of those components.

The steerable wheels 14 are operated by a steering mechanism 28 which includes a steering wheel 30 on a column 31. The steering mechanism in itself may be of known kind and includes for example a transverse bar 32, and mounted for movement by the bar or a similar element of the steering mechanism is a cam 34 constituting a principal element of the mechanism which includes the invention of the above mentioned parent application as well as that of the present, and included in the other figures of the drawings. The vehicle also includes a usual accelerator pedal 36, and a conventional engine governor is indicated at 37 (FIG. 3). FIG. 3 shows the main elements or components of the steering control apparatus of the invention in a neutral position while FIGS. 4–7 show the same apparatus in different positions corresponding to different phases of the steering and driving operation.

Referring particularly to FIG. 3 the apparatus incorporates an accelerator input valve 38 which constitutes a principal feature of the present invention; this valve includes a cylinder 40 and spool means 42 made up of three principal parts including an input member 44 actuated by the accelerator pedal 36 and arranged for being moved inwardly in the cylinder, to the left, in response to depression of the accelerator pedal. The spool means further includes a main spool 46 and an inching spool 48. The input member 44 is provided with a cavity 50 in which is a compression spring 52 working on a disc 54. The main spool 46 includes a stem 56 slidable therein and engaging the disc 54 and biased outwardly by a compression spring 58 in the interior of the spool. The stem 56 at its other end has a head 60.

The cylinder 40 is provided with a pair of spaced interior circumferential grooves 61, 62 and the main spool 46 is provided with lands 63, 64 defining an exterior annular groove 65 therebetween. An aperture 66 is formed in the wall of the main spool from the groove 65 to the interior. The lands 63, 64 are spaced for simultaneously closing the grooves 61, 62 and the latter are selectively opened to the groove 65 upon shifting of the spool. The groove 61 communicates to the reservoir or case 76 in an element 76b thereof.

The inching spool 48 is biased from the main spool 46 by a compression spring 67 and includes a stem 68 engageable with the head 60 of the main spool 46 when moved sufficiently in that direction. The cylinder 40 forms a cavity 69 beyond the inching spool which communicates through a hydrostatic line 70 with a master cylinder 71 of a brake system which includes a brake pedal 72. Upon actuation of the brake pedal hydrostatic fluid is forced or inched into the cavity 69 to provide a braking effect referred to hereinbelow.

An important feature of the invention is that the accelerator valve 38 is operative for providing variable pressure on the hydrostatic fluid in the system, as a function of the degree of movement of the accelerator pedal 36, i.e., the greater the depression of that pedal the greater will be the pressure in the fluid system. This progressive pressure is effected by the gradual movement of the land 64 from the groove 62 and correspondingly increasing the opening to the line 78. The system includes pump means 74 for providing the necessary hydrostatic pressure, through a line 75 which communicates with the reservoir 76, an element thereof being indicated at 76a.

The pressure from the accelerator valve 38 is developed in a pressure line 78 which communicates at 77 with the cylinder of the valve at the groove 65 in the main spool and communicates with both of a pair of steering regulator valves 80L, 80R. These valves are directly associated with the cam 34 included in FIG. 1 and referred to above. These two valves are identical in construction and each includes a cam follower 82, a spool 84 separate therefrom, and a compression spring 86 therebetween. The spool 84 is of dual construction operative for blocking or permitting flow of fluid between the line 78 and the lines 96, according to its position as described hereinbelow. Communicating between the valves 80 is another line 88 which also communicates with a reservoir element 76c.

The cam 34 is elongated and provided with surfaces 90 which may be parallel with the direction of movement, a center depression or notch 92, and ramps 94 at the ends. The cam, as mentioned above, is moved longitudinally, with the transverse bar 32 (FIG. 1), in response to the steering movements of the vehicle, as produced by turning the steering wheel 30. The exact shape of the cam may be as desired, and the depression 92 and ramps 94 may be shaped or positioned according to the detail functions desired, particularly as described hereinbelow.

Leading from the steering valves 80 are fluid lines 96L, 96R which communicate with a directional valve 98 operative for directing the flow of hydrostatic fluid according to the desired direction of travel. For example, this valve is provided with letters F, N, B indicating the positions of the valve for driving forward, neutral position, or driving backward. This valve may be shifted to its desired position in any suitable manner, such as manually. A yieldable check 100 may be provided for normally and releasably retaining the valve in its shifted position. The exact construction of this valve may be as desired and the details thereof need not be described, it being sufficient to say that when it is shifted to forward or backward position, the hydrostatic fluid is transmitted in the desired direction. Elements of the reservoir 76 are seen associated with this valve.

Associated with the directional valve 98 are a pair of reversing valves 102L, 102R communicating with the directional valve through hydrostatic lines 104L–F, 104L–B, and 104R–F, 104R–B. These reversing valves 102 are also of known construction and the details thereof need not be described, but each includes a dual spool 106 biased to a retracted position by a compression spring 108, and the valve includes a chamber 110 beyond the spool at the end opposite the spring. The reversing valves 102 are respectively related to the pumps 17, and are directly controlled by the cam 34 and regulator valves 80, pursuant to the steering operations, and the pumps 17 also vary in response to normal steering operation, both as described hereinbelow.

Leading from the chambers 110 are hydrostatic release lines 112 communicating with corresponding ones of the steering regulator valves 80 and arranged so that when the cam followers 82 are raised, or pushed into the valves, the lines 112 communicate with another release line 113 which leads to the reservoir or case 76d. When pressure is established in the chambers 110, the spools 106 are moved against the springs 108, but when the cam followers 82 are raised, the pressure is relieved from the chambers 110 and the springs 108 move the spools to retracted position, and reverse the valves 102.

A pressure regulator 114 of known type is included for providing pressure in the chambers 110 in the reversing valves 102. The pressure for the chambers 110 is developed by pump means 115 through a line communicating with the reservoir element 76e, and the regulator through an escape line 116 communicates with another element 76f of the reservoir. A line 117 leads from the regulator and has branch lines 117L, 117R leading directly to the chambers 110.

The variable pumps 17 represented in FIG. 1 and referred to above, are diagrammatically indicated in FIGS. 3–7. Since these pumps are of known kind, the construction thereof need not be described in detail, but it is pointed out that each includes a control element or finger 22 referred to above and the displacement of the pump is controlled by the extent of angular movement of that control element. A pair of pump control actuators 118 are provided for directly actuating the fingers 22 and controlling the pumps, each including a cylinder 119 and the plungers 24 identified above, the plungers being on opposite sides of the respective control element 22 and biased into engagement therewith by balanced compression springs 122. Hydrostatic fluid lines 124R–F, 124R–B communicate with the reversing valve 102R and actuator 118R, while a pair of similar lines 126L–F, 126L–B communicate between the reversing valve 102L and the actuator 118L. Upon pressure being developed in one or the other of the chambers in the actuators 118, the control elements 22 are moved in corresponding directions, and the pumps thereby control the flow of hydrostatic fluid from the engine to the motors on the wheels, both as to direction and rate of speed of the wheels. Upon release of fluid pressure in the cylinders 119, the balanced springs 122 retain the plungers 24 and thus the control elements 22 in neutral position, and at all times take up play and retain the plungers in engagement with the control elements.

FIG. 3 shows the components of the apparatus in neutral position while FIGS. 4–7 represent the various components and elements as they are when the vehicle is moving forward, and is being steered in one direction, i. e., to the left. The corresponding movements and positions of the other components in other conditions or movements of the vehicle are not described herein, since it is believed they will be understood from the description above of a single condition.

Actuation and control of the control apparatus is established through the accelerator pedal 36 and corresponding actuation of the accelerator valve 38. In the neutral position of the control apparatus as represented in FIG. 3 where the directional valve 98 is in neutral position, actuation of the accelerator pedal 36 does not result in any movement of the vehicle. For example, upon depression of the pedal 36 the spool means in the valve 38 is moved into the cylinder (to the left), opening the groove 62. Fluid pumped by the pressure means 74 flows through the groove 62, the groove 65, the line 78, and through the steering regulators 80 (e.g. 80R); then through the line 96R and through the directional valve 98. This valve is in neutral position as indicated; the fluid then flow through the reversing valve 102R; the lines 124R–F, 124R–B, from this valve to the actuators 118R are both open and the pressure developed on both ends of the actuator is the same. Accordingly, the springs 122 retain the finger 22R in neutral position, and the corresponding pump 17R remains ineffective, i.e., no fluid is passing therethrough. The same situation holds true in connection with the left hand pump 17L.

As indicated above, pressure in the chambers 110 of the reversing valves 102 moves the spools therein to an advanced position and maintains them there. In the position of FIG. 3, the pressure in those chambers is such as to leave the spools in "open" position, i.e., so that the pressure fluid flows to both ends of the actuators 118, as just referred to.

The steering function of the vehicle includes two phases or features, i.e., in the early stages the inherent characteristics of the pumps 17 are utilized, and in the later stages, the action of the cam 34 and steering regulator valves 80 comes into play. The pumps 17 are of such character that in response to steering action, and the driving wheels 13 following inner and outer circles, the pumps operate and react through the lines 18 (FIGS. 1 and 2) for driving the wheels at correspondingly different speeds according to the different radii of the circles. This characteristic of the pumps broadly is known, but the incorporation of them in this apparatus with the other features of the apparatus is considered invention.

Figure 4:
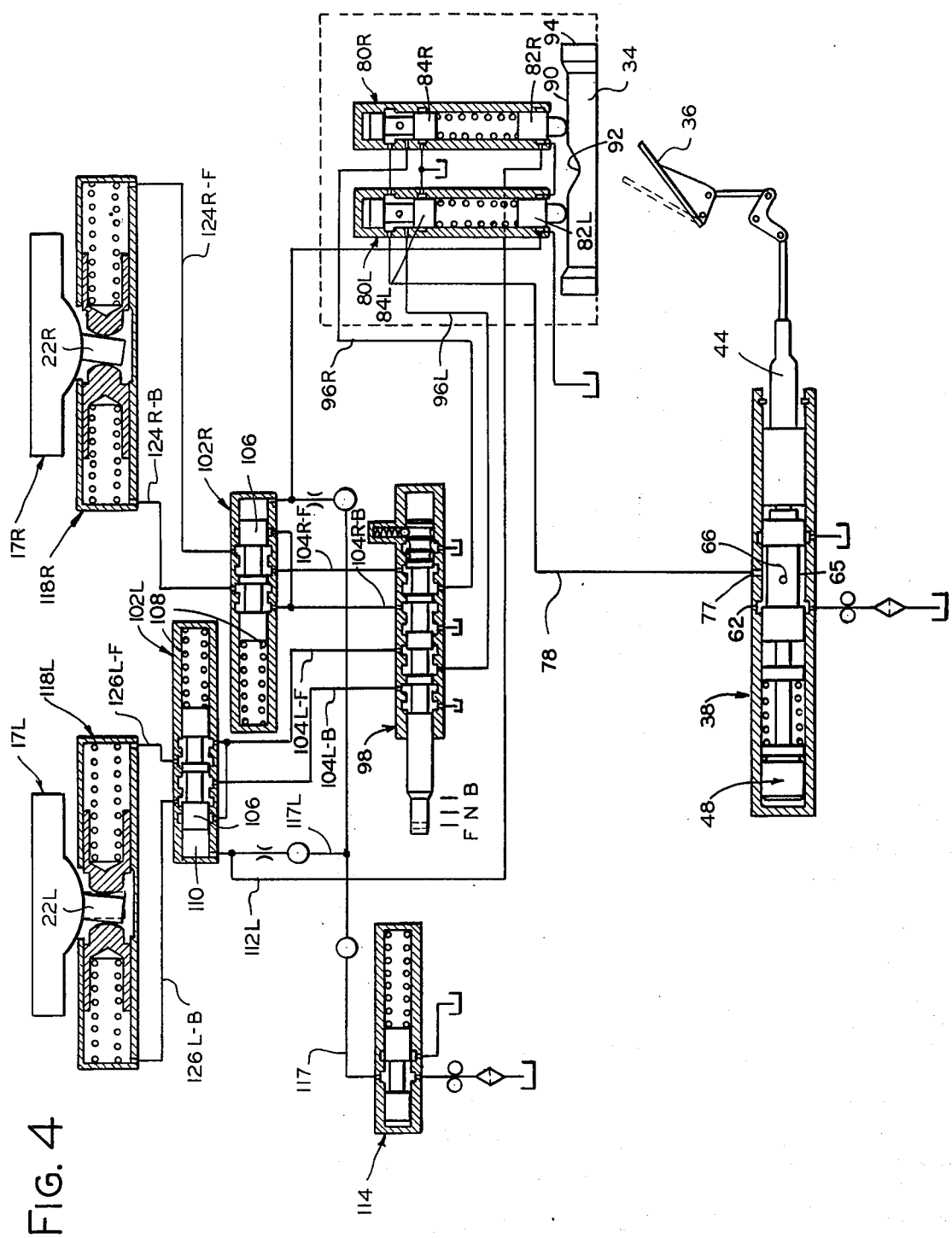
FIG. 4 is a view similar to FIG. 3 showing various elements in different positions in a straight forward movement, without steering.

A first step in driving control is represented in FIG. 4 where the directional valve 98 is shown in forward position, and the fluid pressure in the chambers 110 is such as to move the spools 106 therein to the corresponding position shown, shutting off one of the lines to the corresponding ends of the actuators 118. The operation represented in FIG. 4 is straight ahead driving, without steering. Depression of the acceleration pedal 36 moves the spool means 42 in the accelerator valve inwardly, opening the groove 62 and permitting the fluid to flow through the groove 65, the line 78 and through the steering regulator valves 80, the latter remaining in a neutral position; the same condition exists in connection with both of them but for convenience reference will be made to the right one, 80R; the fluid continues through the line 96R, through the directional valve 98, the line 104R–F, the valve 102R, the line 124R–F and into the right hand, or "forward" end of the actuator 118R. The same condition persists in connection with the other actuator 118L. Accordingly, the plungers 24 in the right hand end of both the actuators are extended and the fingers 22 are moved in corresponding direction (clockwise FIG. 4) both to the same extent and both pumps drive the corresponding motors and wheels at the same rate and the vehicle goes straight forward.

Figure 5:
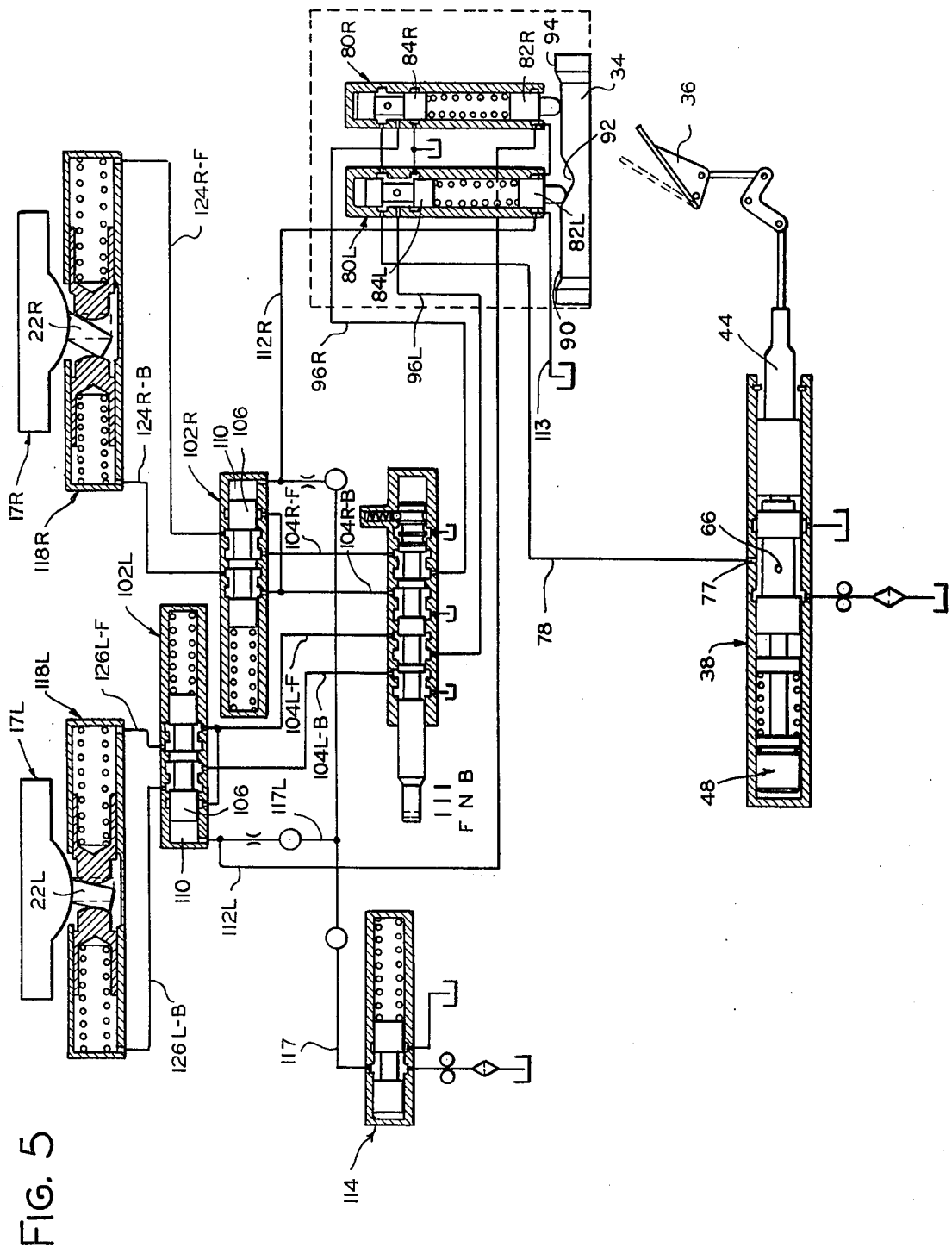
FIG. 5 is a view similar to FIGS. 3 and 4 but showing elements in yet different positions.

FIG. 5 represents a first portion of the steering operation under the control of the cam 34. As the vehicle is steered, the cam 34 is shifted in corresponding direction as stated above, in this case also to the left, and as the depression 92 in the cam is moved over, the cam follower 82L moves into the depression and as it does so, it gradually closes the line 78, reducing the pressure in the line 96L. The pressure theretofore transmitted through that line, through the directional valve 98, the reversing valve 102L and to the chamber in the actuator 118L, is to that extent relieved and the corresponding pump 17L is actuated to a lesser degree. Such a position of that pump is represented in full lines in FIG. 5 or between a far advanced position and a neutral inactive position. On the other hand the pump 17R is shown in full advanced position. As a consequence, the right wheel 13R is rotated at a maximum speed while the left wheel 13L is rotated at a lesser speed.

Figure 6:
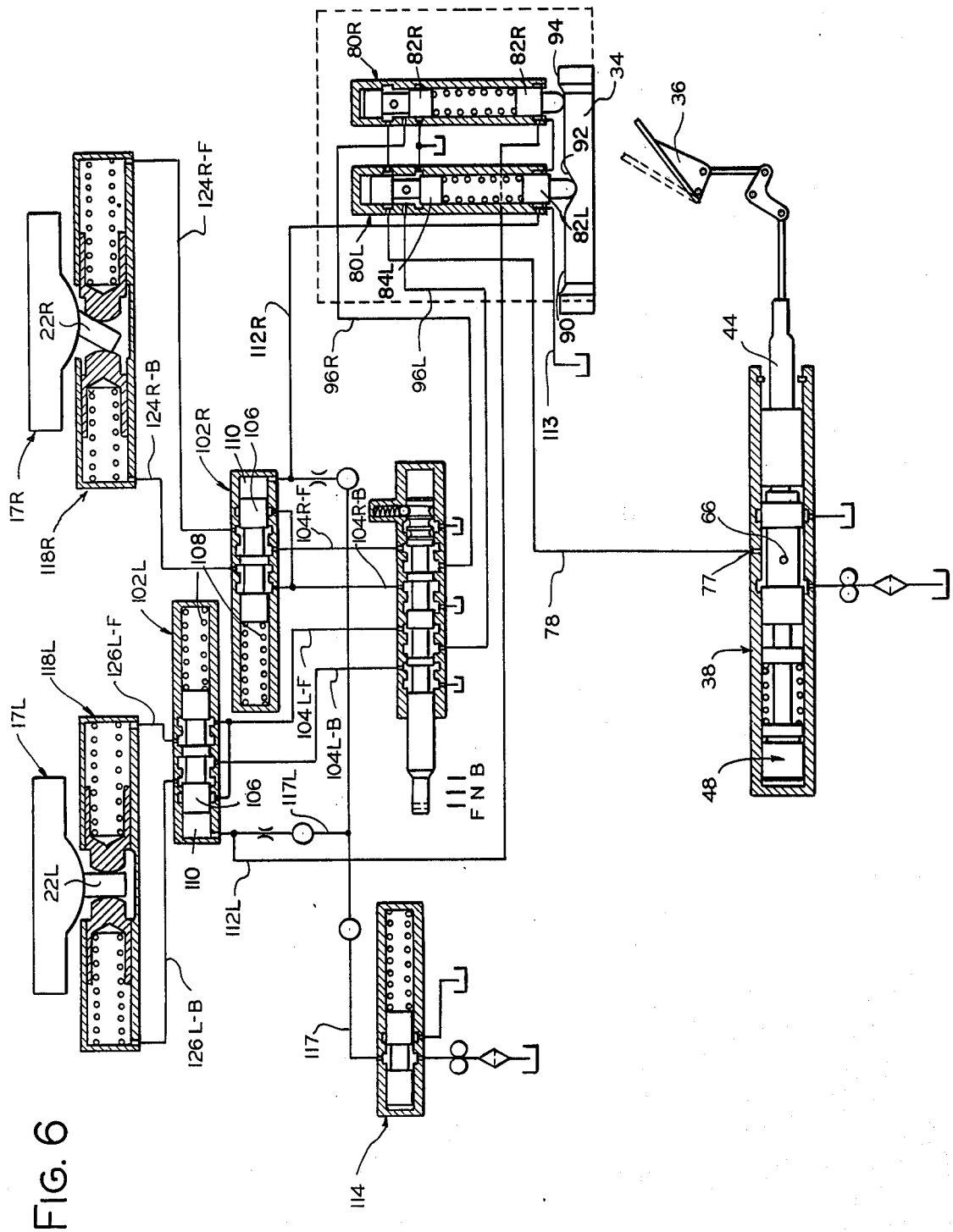
FIG. 6 is a view similar to FIGS. 3–5 and showing various elements in still other positions.

It will be noted that in FIG. 5 the cam follower 82L is not in the lowermost position of the notch 92, and reference is made next to FIG. 6 in which the cam follower is in that position. In such position of the cam follower, the steering regulator valve 80L completely shuts off the pressure from the line 78 to the line 96L, and in this situation all pressure is relieved from the actuator 118L. As a consequence, the corresponding pump 17L is in neutral position, this position being represented by the control element 22L being in its full down position, while the other pump 17R is in advanced position.

Figure 7:
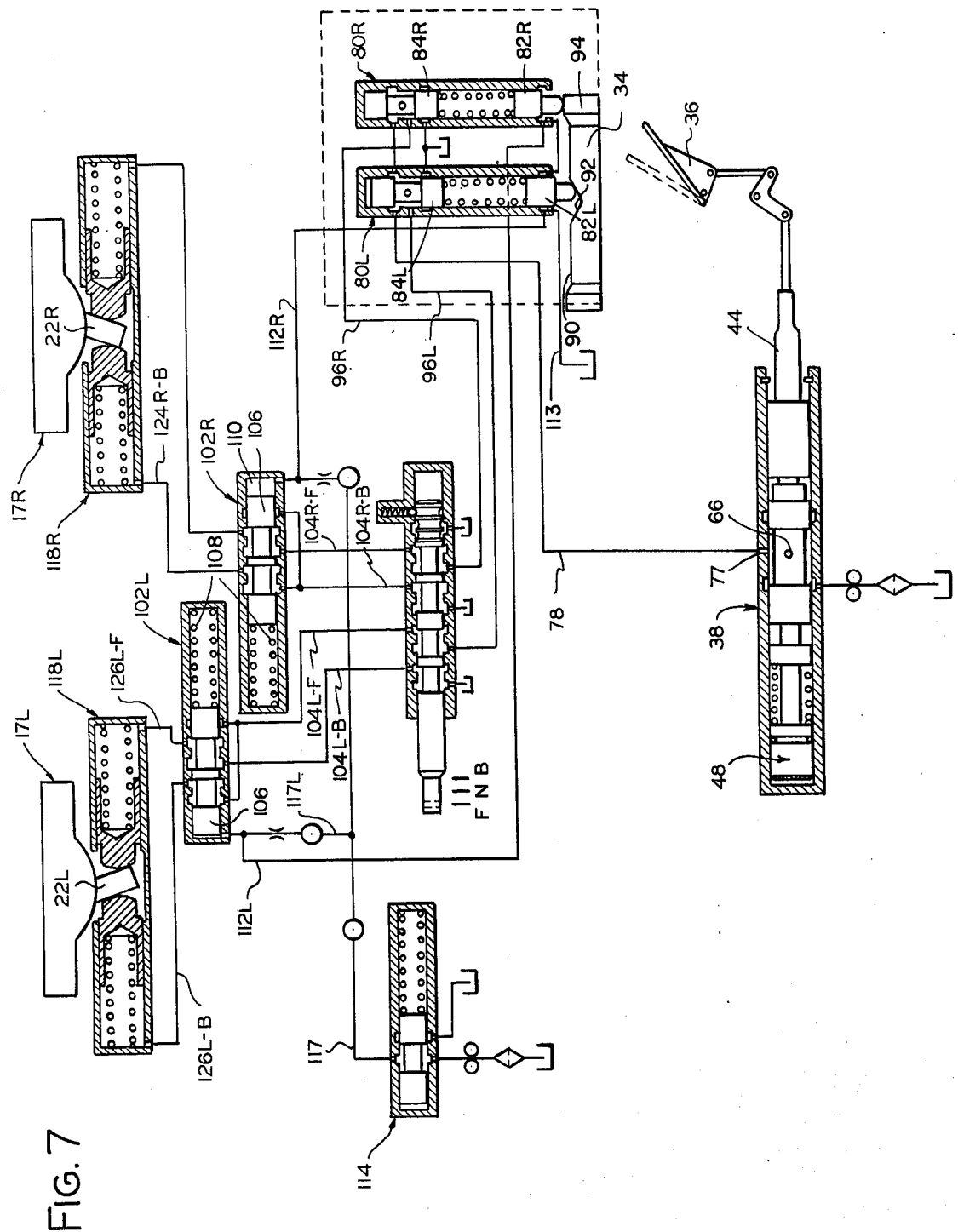
FIG. 7 is a view similar to FIGS. 3–6 but showing the elements in other positions.

It will be noted that in FIG. 6 the cam follower 82R of the other steering regulator valve has not yet encountered the ramp 94, but as the steering wheel is turned further and the steering operation continued, that cam follower rides up that ramp as represented in FIG. 7. When this cam follower thus rides up the ramp, it opens the line 113 and releases the pressure completely from the reversing valve 102L through the corresponding line 112L, and as a result the spool of that valve is shifted completely to the left under the action of the spring 108. This reverses the fluid stream to the actuator 118L, reversing the latter as well as reversing the pump 17L and hence driving that wheel reversely, as indicated by the control element 22L being moved in counterclockwise direction. In the last stage of the steering (FIG. 7) the cam follower 82L rides up the far side of the notch 92, and possibly even onto the surface 90, at least partially opening the line 78 to the line 96L, again effecting greater speed of the left wheel which at the time is turning in reverse direction. Accordingly, the vehicle can be turned in a very short radius, by reversing the direction of rotation of the drive wheels, enabling the vehicle to turn about an internal vertical axis.

The specific steps in steering the vehicle to the right, and travelling backward, will be understood from the foregoing description.

Other important features of the invention are the sensing of the "feel" of the driving and steering steps, and the control of the steering independently of the speed of the vehicle or the lift truck. In realizing these features, the fluid pressure in the line 78 reacts through the aperture 66 in the main spool 46 of the valve 38. This pressure works against the spring 58 tending to move the spool 46 to closing position, i.e., to the right, correspondingly restricting the line 75. This pressure backs up from the actuators 118, through the steering regulator valves 80, and produces a pressure effect according to the demand in the steering operation. The springs 122 in the actuators 118 are balanced, and in response to greater pressure in the fluid system at one end of the actuators, the spring at the other end becomes increasingly compressed and the reaction pressure from that spring determines the pressure required in the fluid system for moving the finger 22 any given amount. Thus this direct reaction pressure transmitted to the fluid system, produces a "feel" similar to that of a direct mechanical system. This pressure in the fluid system backs up into the accelerator valve 38 and correspondingly moves the main spool 46 as referred to. The control pressure is equal to the spring force plus the system pressure.

A similar pressure situation exists in connection with the steering regulator valves 80. As the follower 82L proceeds down into the notch 92 (FIG. 5) the upper spool element 84L gradually restricts the opening between the line 78 and the line 96L, reducing the flow to the actuator 118L, but the line 78 to the steering regulator valve 80R remains fully open and the pressure from the actuator 118R backs up with full force to the accelerator valve 38. When the follower 82L reaches the bottom of the notch (FIG. 6), the line 78–96L is cut off completely as referred to above, thus leaving full pressure from the actuator 118R through the steering regulator valve 80R and through the line 78.

In the course of these pressure developing, regardless of the speed of the vehicle or the lift fork, the pressure in the control system tends to continue to rise, and will be relieved in the accelerator valve 38, by the pressure in the interior of the main spool 46 tending to move it to the right as explained above, and accordingly the steering operation is to that extent independent of the speed of the tractor or the lift fork.

Another great advantage of the invention is that the control apparatus includes two independent systems (posterior to the accelerator valve 38) for controlling the two pumps 17 and as a consequence the requirement for accuracy in the control steps is at a minimum. The gradual difference in speed of the outside and inside wheels, in all phases of the turn, produces a full differential action, eliminating scrubbing of the wheels.

In the use of the braking/inching mechanism 71, 72 (FIG. 3), depression of the brake pedal 72 forces fluid from the master cylinder 71 into the space 69 and forces the inching spool 48 against the main spool 46, and upon sufficient pressure being applied, moves the main spool to neutral or closed position. In the latter action, the spring 52 yields if the input member 44 should be in advanced position. Upon the valve 38 being thus shut off, or to the extent that it is restricted, the pressure is relieved from the actuators 118, and the springs 122 therein move the pumps toward neutral or inactive position.

We claim:
1. In a pivot steering vehicle,
a pair of hydrostatically operated driving wheels,
means for driving the driving wheels including a pump and a motor for each wheel, the pump providing driving power and the motor including a control element for controlling the speed and direction of the wheel as driven by the pump, and the control elements being independently actuatable for correspondingly independently controlling the wheels as to speed and direction,
steerable wheels and a steering wheel for actuating them and steering the vehicle,
a fluid line leading to each control element,
means for producing pressure in the fluid in the fluid lines and transmitting the pressure to the central elements,
first control means independent of the steering wheel and including an accelerator valve, the accelerator valve including a cylinder and spool means therein, and the spool means including a main spool operative for closing and opening the fluid lines, the main spool being provided with a hollow interior and a port therefrom providing access of the fluid in the fluid lines to enter into the interior of the main spool, the main spool including a main portion and a second portion movable relative to the first, the second portion being positioned for reaction thereagainst by the pressure of the fluid in the interior of the main spool, manually actuatable means for actuating the spool means, and thereby actuating the accelerator valve, the accelerator valve being operable, in response to actuation of the spool means, for controlling the transmission of pressure in the fluid lines, throughout a predetermined range of variation of pressure to the motors in proportion to the degree of actuation of the manually actuatable means and correspondingly driving the driving means at corresponding speeds, the motors being effective for establishing corresponding reaction pressure through the fluid to the spool means and thereby the manually actuatable means, whereby to enable the operator to sense the pressure being applied to the central elements, the spool means and manually actuatable means being so relatively positioned and constructed that the manually actuatable means acts against the second portion of the main spool means and hence the pressure of the fluid reacts against the second portion of the main spool means and thereby against the actuatable means, said control means due to its independence of the steering wheel being operative for controlling the motors throughout the full range regardless of the condition of steering or any position of the vehicle due to steering.

2. A combination according to claim 1 wherein the fluid lines have common communication with the accelerator valve, the combination includes second control means actuated by the steering wheel for controlling the pressure in the fluid lines for correspondingly controlling the motors independently as to speed and direction, the second control means being operative independent of the accelerator valve.

3. A combination according to claim 2 and including means operative in response to actuation of the steering wheel for predetermining the pressure applied to the individual control elements and thereby correspondingly driving the driving wheels at corresponding speeds.

4. A combination according to claim 3 wherein the steering wheel is operative for controlling pressure applied to the different control elements and the direction of application thereof, whereby to selectively effect driving of the motors and the corresponding driving wheels at respectively different speeds in opposite directions.

5. A combination according to claim 4 wherein the second control means includes a regulator valve in each fluid line, and a single common cam member actuated by the steering wheel operative for individually controlling the pressures in the fluid lines and thus controlling them independently of the second control means.

6. A combination according to claim 5 wherein each control element in the motors is movable in each of opposite directions, and the pressurized fluid in the fluid lines is operative for moving them, and balanced springs are biased against opposite sides of each control element and operative for retaining the control elements in a neutral position in the absence of pressure in the fluid lines.

7. A combination according to claim 1 and including manually actuated brake means, an inching spool movable by the brake means, yielding means interposed between the main spool and the inching spool, and the inching spool in response to movement thereof by the brake means being moved against the yielding means and thereby against the main spool in opposition to the advancing movement of the latter by the manually actuatable means, and thereby tending to close said fluid lines.

8. In a pivot steering vehicle, a pair of hydrostatically operated driving wheels, means for driving the driving wheels including a pump and a motor for each wheel, the pump providing driving power and the motor including a control element for controlling the speed and direction of the wheel as driven by the pump, and the control elements being independently actuatable for correspondingly independently controlling the wheels as to speed and direction, a fluid line leading to each control element, means for producing pressure in the fluid in the fluid lines and transmitting the pressure to the control elements, first control means including an accelerator valve for controlling the transmission of pressure in the fluid to the motors, the accelerator valve including a cylinder and spool means movable therein, manually actuatable means for moving the spool means, the manually actuatable means being operable for progressively moving a main spool of the spool means in the cylinder in advancing direction, for correspondingly progressively increasing the pressure of fluid to the motors, an inching spool in the cylinder, a manually actuated brake member for moving the inching spool in direction against the main spool counter to the advancing direction of the main spool, yieldable means between the manually actuated advancing means and the main spool, and yieldable means interposed between the manually actuated brake member and the main spool, the inching spool, in response to movement thereof by the brake member, being operative for biasing the main spool in retracting direction for correspondingly closing the fluid line means, the main spool being positioned in the cylinder relative to the fluid line means so as to be responsive to the reaction pressure from the driving means and transmitting that pressure to the manually actuatable means.

9. A combination according to claim 8 wherein the main spool has a hollow interior communicating with the fluid lines, a movable spool member in the main spool, the movable spool member being movable by the pressure of the fluid in the interior of the main spool, the pressure thereby reacting against the movable member and the inching spool.

10. A combination according to claim 9 wherein the manually actuatable means acts against the movable member of the main spool, and the pressure of the fluid in the interior of the main spool acts against the movable member counter to the action of the manually actuatable means.

* * * * *